United States Patent
Kubo et al.

[11] Patent Number: 5,532,638
[45] Date of Patent: Jul. 2, 1996

[54] SUPERCONDUCTING ENERGY STORAGE APPARATUS

[75] Inventors: Morihiro Kubo; Yukio Ishigaki, both of Hitachi; Takeshi Itoh; Hirokazu Misawa, both of Nagoya, all of Japan

[73] Assignees: Hitachi, Ltd.; Chubu Electric Power Co., Inc., both of Japan

[21] Appl. No.: 123,477

[22] Filed: Sep. 20, 1993

[30] Foreign Application Priority Data

Sep. 21, 1992 [JP] Japan ................... 4-251381

[51] Int. Cl.⁶ ........................................... H02H 7/20
[52] U.S. Cl. ................ 327/368; 327/365; 327/366; 327/438; 327/442; 361/19; 361/91
[58] Field of Search ........................ 307/245, 246, 307/632, 633, 284; 361/91, 100, 19, 54, 55; 327/365, 366, 419, 438, 442, 443, 447, 368, 376, 377; 257/38; 363/37, 14

[56] References Cited

U.S. PATENT DOCUMENTS

| | | | |
|---|---|---|---|
| 3,792,289 | 2/1974 | Kazem | 361/100 |
| 4,297,739 | 10/1981 | Goldin et al. | 361/91 |
| 4,545,002 | 10/1985 | Walker | 363/37 |
| 4,599,633 | 7/1986 | Thire et al. | 257/38 |
| 4,855,859 | 8/1989 | Tixador et al. | 361/91 |
| 4,930,034 | 5/1990 | Kusserow et al. | 361/91 |
| 5,210,674 | 5/1993 | Yamaguchi et al. | 361/19 |
| 5,212,505 | 6/1993 | Kubo et al. | 361/19 |

FOREIGN PATENT DOCUMENTS

| | | | |
|---|---|---|---|
| 0170007 | 7/1986 | Japan | 361/19 |
| 1-177839 | 7/1989 | Japan . | |
| 4-211105 | 8/1992 | Japan . | |

*Primary Examiner*—Timothy P. Callahan
*Assistant Examiner*—Dinh T. Le
*Attorney, Agent, or Firm*—Fay, Sharpe, Beall, Fagan, Minnich & McKee

[57] ABSTRACT

In a superconducting energy storage apparatus including an AC-DC converter unit, a superconducting coil, a quench protection unit and a mechanical type persistent current switch, a self-firing type thyristor switch is connected in parallel to the mechanical type persistent current switch to be first operated in the event of an occurrence of trouble in an associated electric power system, and a control unit generates an ON instruction signal for turning on the persistent current switch so as to immediately establish a persistent current mode.

4 Claims, 3 Drawing Sheets

SUPERCONDUCTING ENERGY STORAGE APPARATUS

BACKGROUND OF THE INVENTION

This invention relates to a superconducting energy storage apparatus connected through an AC-DC converter unit to an electric power system so as to regulate transmission of electric power through the electric power system, and more particularly to the timing control of turning on a persistent current switch used for establishing a persistent current mode while energy is being charged into or discharged from the superconducting energy storage apparatus connected to the electric power system.

With the recent remarkable development of superconducting technology, superconducting coils are now finding more and more useful applications to the fields of nuclear fusion, charged particle acceleration, magnetic floating, medical care, etc. Also, application of a superconducting energy storage apparatus to the field of electric power is now planned so that the apparatus can be used to carry out various functions including stabilization of the electric power system, compensation of fluctuating loads and storage of surplus electric power.

If some kind of serious trouble might occur in the electric power system while the superconducting energy storage apparatus is carrying out the function of stabilization of the electric power system or the function of compensation of a fluctuating load, it is necessary to immediately disconnect the superconducting energy storage apparatus from the electric power system and to shift the operation mode to a persistent current mode so as to prevent further spread of the trouble occurring on the side of the electric power system. Therefore, a persistent current switch used to establish the persistent current mode is required to be turned on at the highest possible speed.

FIG. 5 shows the structure of one form of a prior art superconducting energy storage apparatus including a mechanical type persistent current switch. Referring to FIG. 5, a superconducting coil 3 installed in a cryostat 4 is connected to an AC-DC converter unit 6 through a quench protection unit 5, and the mechanical type persistent current switch 1 is connected in parallel to the AC-DC converter unit 6. The AC-DC converter unit 6 is connected at its power receiving side to an electric power system 9. A control unit 10 is connected to the mechanical type persistent current switch 1 and the AC-DC converter unit 6.

In the prior art superconducting energy storage apparatus having the structure shown in FIG. 5, the persistent current mode is established in a manner as described now. In the normal operation mode, the energy is charged into or discharged from the superconducting coil 3 through the AC-DC converter unit 6 connected to the electric power system 9. The normal operation mode is shifted to the persistent current mode by first operating the AC-DC converter unit 6 as an inverter, and the mechanical type persistent current switch 1 is then turned on in response to an ON instruction signal applied from the control unit 10, with the result that the direct current, having flowed through the AC-DC converter unit 6, is now shifted to flow through the mechanical type persistent current switch 1, thereby forming a closed loop including the mechanical type persistent current switch 1 and the superconducting coil 3.

Publications relating to such a persistent current switch include JP-A-Hei-1-177839 and JP-A-Hei-4-211105.

In the prior art superconducting energy storage apparatus described above, two steps are required until the mechanical type persistent current switch 1 is turned on. That is, in the first step, the AC-DC converter unit 6 is operated once as an inverter generating an inverse voltage so as to avoid an undesirable short-circuit that may occur before the mechanical type persistent current switch 1 is turned on, and, in the second step, the mechanical type persistent current switch 1 is turned on in response to the ON instruction signal applied from the control unit 10. Thus, a considerably long period of time is required until the operation mode is shifted to the persistent current mode. It is well known that a mechanical type switch as described above requires a period of time generally longer than several hundred msec until the switch completes its operation after it receives an ON instruction signal.

Thus, when the shift of the operation mode of the superconducting energy storage apparatus to the persistent current mode is delayed after the occurrence of trouble in the electric power system 9, the super-conducting coil 3 may discharge its stored energy to the electric power system 9 through the AC-DC converter unit 6, with the result that electrical apparatuses in the electric power system 9 may be heavily damaged.

SUMMARY OF THE INVENTION

It is an object of the present invention to provide a superconducting energy storage apparatus connected to an electric power system and provided with a mechanical type persistent current switch so that the operation mode can be immediately shifted to the persistent current mode in the event of occurrence of some kind of trouble in the associated electric power system.

According to one aspect of the present invention, there is provided a superconducting energy storage apparatus comprising an AC-DC converter unit connected at its power receiving side to an electric I power system, a superconducting coil connected in series with the AC-DC converter unit through a quench protection unit, a mechanical type persistent current switch connected in parallel to the AC-DC converter unit, a self-firing type thyristor switch connected in parallel to the mechanical type persistent current switch and triggered when a voltage higher than a predetermined setting is applied, and a control unit generating an ON instruction signal for turning on the mechanical type persistent current switch in response to the operation of the thyristor switch.

According to another aspect of the present invention, there is provided a superconducting energy storage apparatus comprising an AC-DC converter unit connected at its power receiving side to an electric power system, a superconducting coil connected in series with the AC-DC converter unit through a quench protection unit, a mechanical type persistent current switch connected in parallel to the AC-DC converter unit, and a control unit generating an instruction signal instructing a bypass pair operation of the AC-DC converter unit when ann occurrence of some kind of trouble in the electric power system is detected and, after the bypass pair operation of the AC-DC converter unit, generating an ON instruction signal for enabling the mechanical type persistent current switch.

In the two forms of the superconducting energy storage apparatus of the present invention having the structures described above, the self-firing type thyristor switch is first operated or the AC-DC converter unit is first instructed to initiate make the bypass pair operation, and the mechanical type persistent current switch is then turned on so as to establish the persistent current mode.

Thus, when the immediate shift of the operation mode of the superconducting energy storage apparatus to the persistent current mode is required as in the event of occurrence of some kind of trouble in the electric power system, the self-firing type thyristor switch is operated or the AC-DC converter is placed in the bypass pair mode so as to improve the high-speed turn-on characteristic of the mechanical type persistent current switch, and the mechanical type persistent current switch is then turned on so as to secure the low resistance characteristic of the persistent current switch.

DESCRIPTION OF THE PREFERRED EMBODIMENTS

Figure 1:
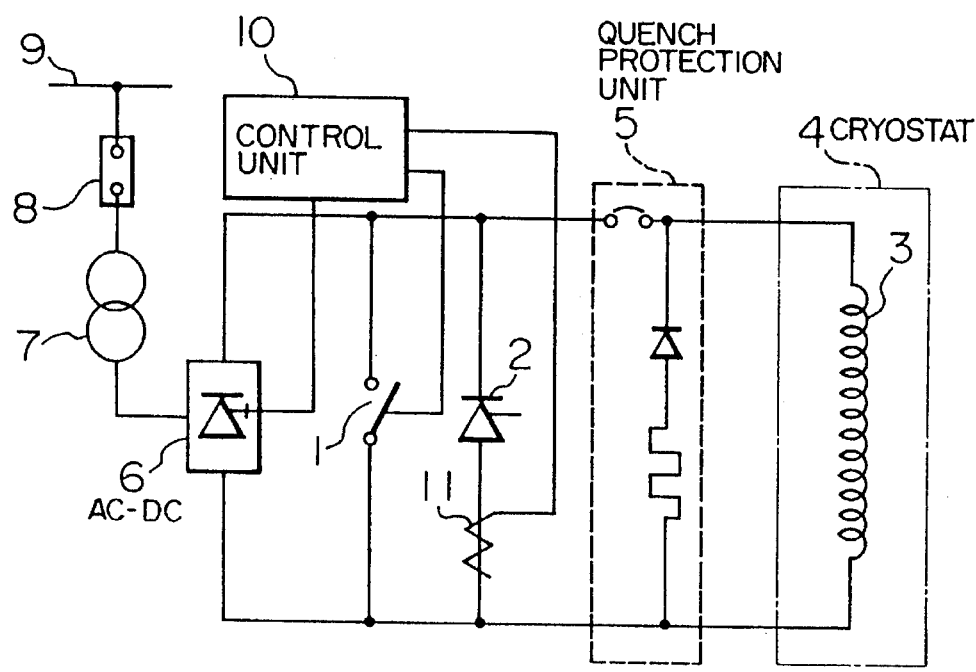
FIG. 1 is an electrical circuit diagram showing the structure of an embodiment of the super-conducting energy storage apparatus of the present invention.
Figure 5:
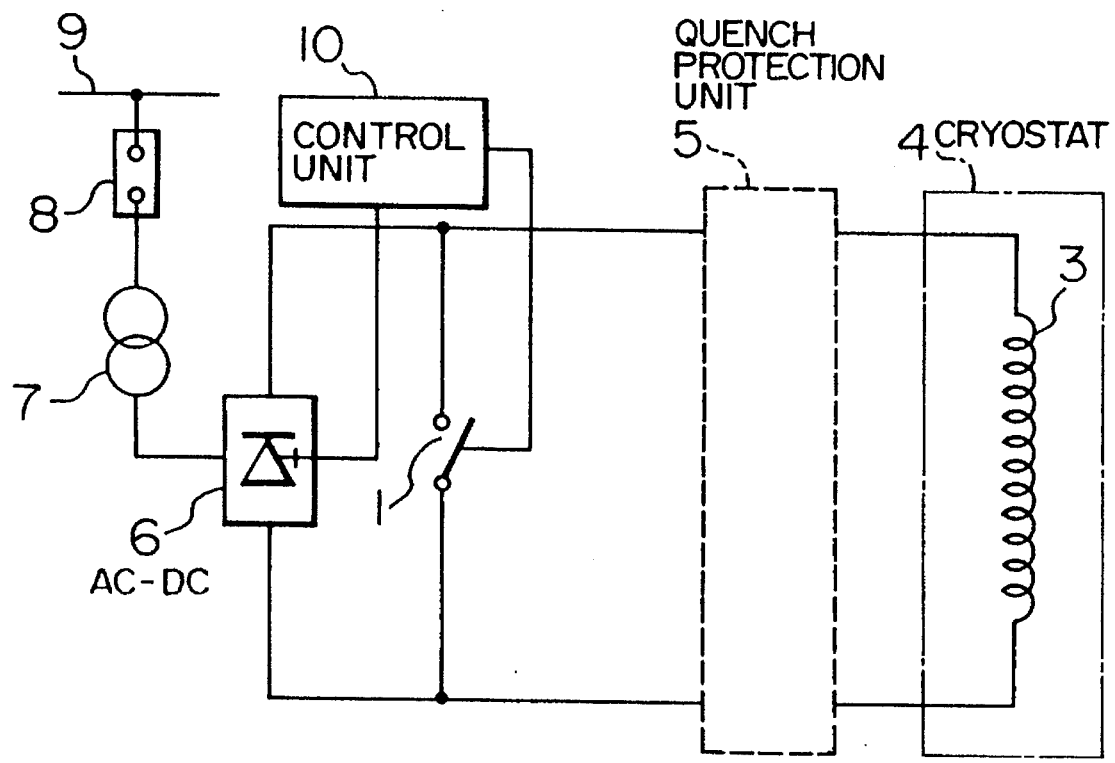
FIG. 5 is an electrical circuit diagram showing the structure of a prior art superconducting energy storage apparatus.

FIG. 1 is an electrical circuit diagram showing the structure of an embodiment of the superconducting energy storage apparatus of the present invention. In FIG. 1, like reference numerals are used to designate like parts appearing in FIG. 5.

Referring to FIG. 1, the superconducting energy storage apparatus includes a superconducting coil 3 installed in a cryostat 4 and connected to an AC-DC converter unit 6 through a quench protection unit 5. Electric power from an electric power system 9 is supplied to the superconducting coil 3 through the AC-DC converter unit 6. A mechanical type persistent current switch 1 operating in response to an ON instruction signal applied from a control unit 10 is connected in parallel to a self-firing type thyristor switch 2, and this parallel circuit is connected to the superconducting coil 3 to form a closed loop with the superconducting coil 3. The AC-DC converter unit 6 is connected to the electric power system 9 through a transformer 7, an AC circuit breaker 8, etc.

The operation of the superconducting energy storage apparatus having the structure shown in FIG. 1 will now be described.

When the superconducting energy storage apparatus is utilized so as to stabilize the operation of the electric power system 9 or to compensate for a fluctuating load in the electric power system 9, the energy stored in the superconducting coil 3 is converted in the AC-DC converter unit 6 into active power and reactive power under control of the control unit 10. In the event of an occurrence of some kind of trouble on the side of the electric power system 9 during the above manner of electric power control, the operation mode of the superconducting energy storage apparatus is immediately shifted to the persistent current mode.

Figure 2:
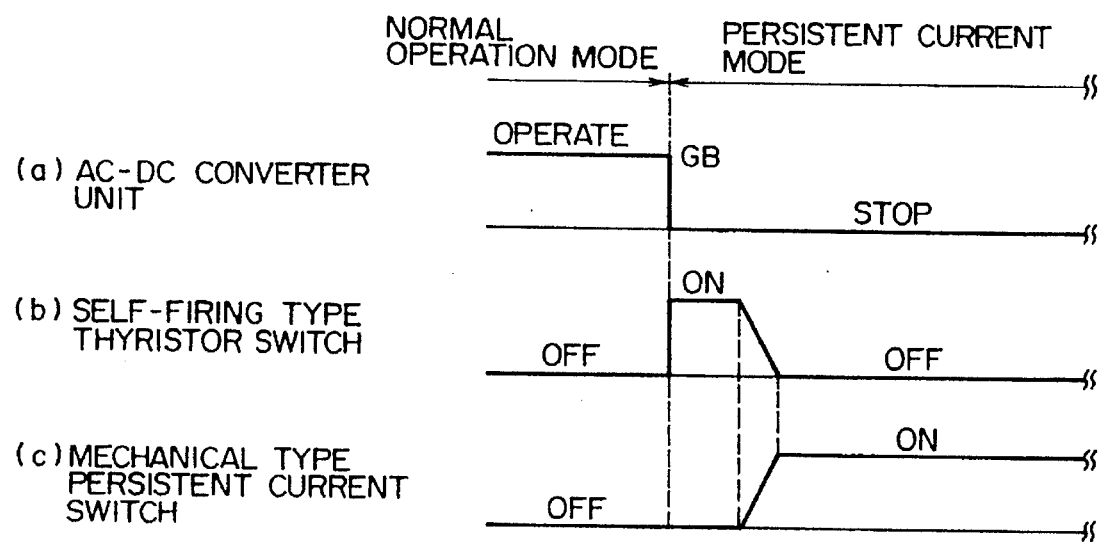
FIG. 2 is a timing chart for illustrating the operation of the superconducting energy storage apparatus shown in FIG. 1.

There are various cases giving rise to the shift of the operation mode of the superconducting energy storage apparatus to the persistent current mode. In one of these cases, the self-firing type thyristor switch 2 is triggered due to blocking of the gates of the AC-DC converter unit 6. In another case, the AC circuit breaker 8 on the side of the electric power system 9 is tripped to initiate an interlocking protective operation in the event of occurrence of some kind of trouble on the side of the electric power system, the DC system, the control power source, etc., and the self-firing type thyristor switch 2 operates due to the application of an overvoltage. In still another case, the AC-DC converter unit 6 is disabled to cause automatic gate blocking, and, as a result, the self-firing type thyristor switch 2 operates. In each of the above cases, the operation of the self-firing thyristor switch 2 is detected by a DC detector 11, and the output signal of the DC detector 11 is supplied to the control unit 10. The control unit 10 applies its ON instruction output signal to the mechanical type persistent current switch 1 to turn on the switch 1. As soon as the mechanical type persistent current switch 1 is turned on, the self-firing type thyristor switch 2 is automatically turned off due to the forward drop in the thyristor 2. FIG. 2 is a timing chart of operation of the superconducting energy storage apparatus shown in FIG. 1.

It will be seen from the above description that, in any situation, the operation mode of the superconducting energy storage apparatus can be immediately shifted to the persistent current mode, so that the current flows continuously through the closed loop including the superconducting coil 3 and the mechanical type persistent current switch 1, so that the energy can be stored in the superconducting coil 3 by the function of the superconducting energy storage apparatus.

Figure 3:
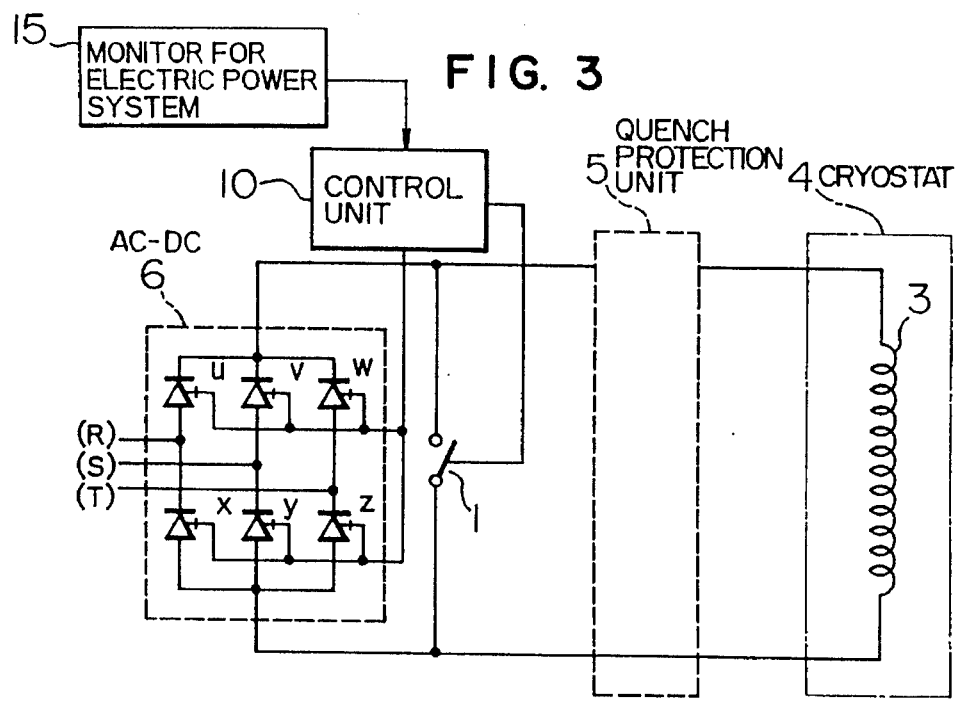
FIG. 3 is an electrical circuit diagram showing the structure of another embodiment of the superconducting energy storage apparatus of the present invention.

The embodiment described above employs by way of example, the combination of the self-firing type thyristor switch 2 and the mechanical type persistent current switch 1. FIG. 3 shows another embodiment in which the self-firing type thyristor switch 2 shown in FIG. 1 is eliminated, and, in lieu of the thyristor switch 2, the bypass pair operation of the AC-DC converter unit 6 is utilized. In FIG. 3, the same reference numerals are used to designate the same or equivalent parts appearing in FIG. 1.

In the embodiment shown in FIG. 3, in the event of occurrence of some kind of trouble on the side of, for example, the electric power system, a monitor 15 for the power system is provided and supplies a signal indicative of occurrence of the trouble to the control unit 10, and the control unit 10 immediately generates an instruction signal for causing the bypass pair operation of the AC-DC converter unit 6 to begin, so that the AC-DC converter unit 6 operates in the bypass pair mode. After a predetermined period of time from the time of generation of the bypass pair operation instruction signal, the control unit 10 generates an ON instruction signal to turn on the mechanical type persistent current switch 1, thereby establishing the persistent current mode.

Figure 4:
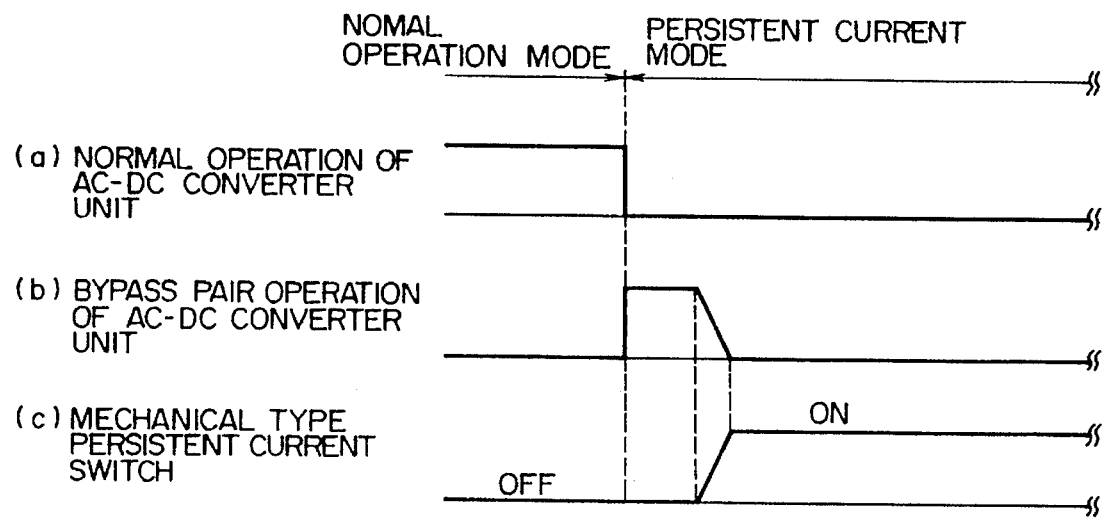
FIG. 4 is a timing chart for illustrating the operation of the superconducting energy storage apparatus shown in FIG. 3.

FIG. 4 is a timing chart of the operation of the superconducting energy storage apparatus shown in FIG. 3. In FIG. 3, the bypass pair operation is an operation of concurrently turning on two thyristor arms having the same phase of a three-phase thyristor bridge constituting the AC-DC converter, for example, by turning on respetive gate-controllable thyristors of thyristor arms u and x of the R phase of the AC-DC converter 6. The bypass pair operation results in shortcircuiting the AC power supply side when viewing from the DC power receiving side. It also results in shutting off or separating the load side when viewing from the AC power supply side.

This second embodiment, which does not use the self-firing type thyristor switch 2 is also as effective as the first embodiment in that, in any situation, the operation mode of the superconducting energy storage apparatus is immediately shifted to the persistent current mode, so that the energy can be stored in the superconducting coil 3 by the function of the superconducting energy storage apparatus.

The superconducting energy storage apparatus according to the present invention provides the following advantages:

(1) By the use of the self-firing type thyristor switch, the ON characteristic of the mechanical type persistent current switch can be greatly improved, so that the switch can be turned on without any substantial delay.

(2) In an emergency, such as occurrence of serious trouble in the electric power system or in the AC-DC converter unit, the persistent current mode can be immediately established, so that undesirable spread of damage to electrical apparatuses in the electric power system can be minimized. Therefore, the overall safety of the system can be greatly enhanced.

(3) Replacement of the function of the self-firing type thyristor switch by the bypass pair mode of the AC-DC converter unit is advantageous from the aspect of the cost merit because the resultant structure of the superconducting energy storage apparatus is generally similar to that of the prior art.

We claim:

1. A superconducting energy storage apparatus improved in generating a persistent current mode operation in response to a possible fault generated in an electric power system, said apparatus comprising:

an AC-DC converter having a power receiving side connected to an electric power system;

a quench protection unit connected in parallel with said AC-DC converter;

a superconductive coil connected in parallel with said quench protection unit;

a mechanical type persistent current switch connected in parallel with said AC-DC converter;

a self-firing type thyristor switch Connected to be in parallel with said mechanical type persistent current switch and to self-fire in response to a voltage applied thereto due to said fault and which is higher than a predetermined voltage; and control means for closing said mechanical type persistent current switch in response to the self-firing of said self-firing type thyristor switch, such that a closed circuit is formed consisting essentially of said coil and the mechanical type persistent current switch to enable a persistent current mode operation in the closed loop.

2. An apparatus according to claim 1, further comprising a DC detector for detecting that current flows through the self-firing type thyristor switch, and for providing a detector output signal to the control means as an indication that said detected current is flowing.

3. An apparatus according to claim 1, wherein the control means includes detection means for detecting a self-fired ON state of the self-firing type thyristor switch, and a control unit for turning on the mechanical type persistent current switch in response to an output signal from the detection means indicating the self-fired ON state.

4. A superconducting energy storage apparatus improved in generating a persistent current mode operation in response to a possible fault generated in an electric power system, said apparatus comprising:

an AC-DC converter having a power receiving side connected to an electric power system;

a quench protection unit connected in parallel with said AC-DC converter;

a superconductive coil connected in parallel with said quench protection unit;

a mechanical type persistent current switch connected in parallel with said AC-DC converter;

a self-firing type thyristor switch connected to be in parallel with said mechanical type persistent current switch, and to self-fire in response to a voltage applied thereto due to said fault and which is higher than a predetermined voltage; and control means for turning on said mechanical type persistent current switch in response to the self-firing of said self-firing type thyristor switch;

wherein the self-firing type thyristor switch and the superconductive coil form a first closed loop when the self-firing type thyristor switch is in the self-fired ON state; and wherein said control means turns on said mechanical type persistent current switch in response to detection of a current flowing through said self-firing type thyristor switch, thereby forming a second closed loop consisting essentially of the superconductive coil and the mechanical type persistent current switch to enable a persistent current mode operation in the second closed loop.

* * * * *